March 3, 1942.    C. A. RUESENBERG ET AL    2,275,068
FRICTION CLUTCH
Filed May 6, 1939    2 Sheets-Sheet 1

Inventors:
Carl A. Ruesenberg and
Joseph Pathus.
By: Edward C. Gritzbaugh
Atty.

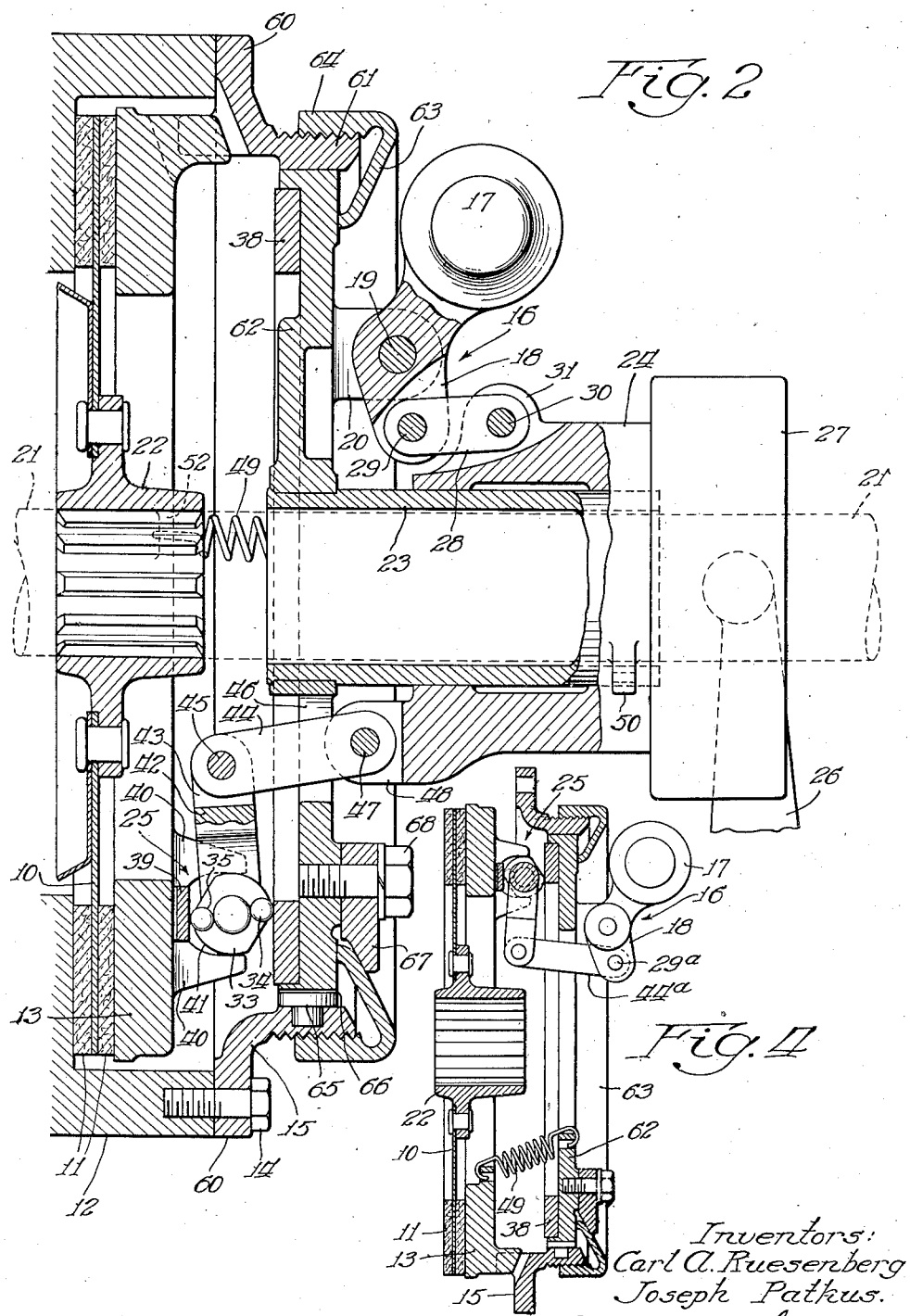

Patented Mar. 3, 1942

2,275,068

UNITED STATES PATENT OFFICE 2,275,068

FRICTION CLUTCH

Carl A. Ruesenberg and Joseph Patkus, Rockford, Ill., assignors to Borg-Warner Corporation, Chicago, Ill., a corporation of Illinois Application May 6, 1939, Serial No. 272,092

11 Claims. (Cl. 192—105)

This invention relates to friction clutches and more particularly to friction clutches of the centrifugally operable type. An object of the invention is to provide a centrifugal clutch having a manual overcontrol for releasing the clutch from centrifugal engagement, wherein the manual pressure necessary for effecting such release is only a fraction of the engaging pressure of the clutch.

In general, the invention aims to achieve this result by providing an arrangement wherein the centrifugal forces developed in the centrifugal elements amount to only a fraction of the total force applied to the pressure plate for clutch packing, the packing pressure being derived from said centrifugal forces by force multiplying mechanism interposed between the centrifugal elements and the pressure plates, and the manual release pressure being applied directly to the centrifugal elements, whereby it is only necessary to counteract the forces developed in the centrifugal elements in order to neutralize the packing pressure.

Another object of the invention is to provide a novel and improved means for effecting adjustment between the centrifugal elements and the pressure plate, in an arrangement of the general type mentioned above. The invention contemplates, in this respect, making it possible to quickly effect fine adjustments between the centrifugal element and the pressure plate so as to compensate for facing wear, etc., without affecting the function of the manual release means.

A further object of the invention is to provide a novel and improved type of yielding means for transmitting to the pressure plate all forces received through the force multiplying mechanism from the centrifugal elements.

The above and other objects, advantages and uses of our invention will become more apparent from a reading of the following specification and claims taken in connection with the appended drawings which form a part of this specification and wherein:

Fig. 2 is an axial sectional view of the same taken as indicated by the line 2—2 of Fig. 1;

Fig. 4 is an axial sectional view of a clutch embodying a modified form of the invention.

Figure 1:
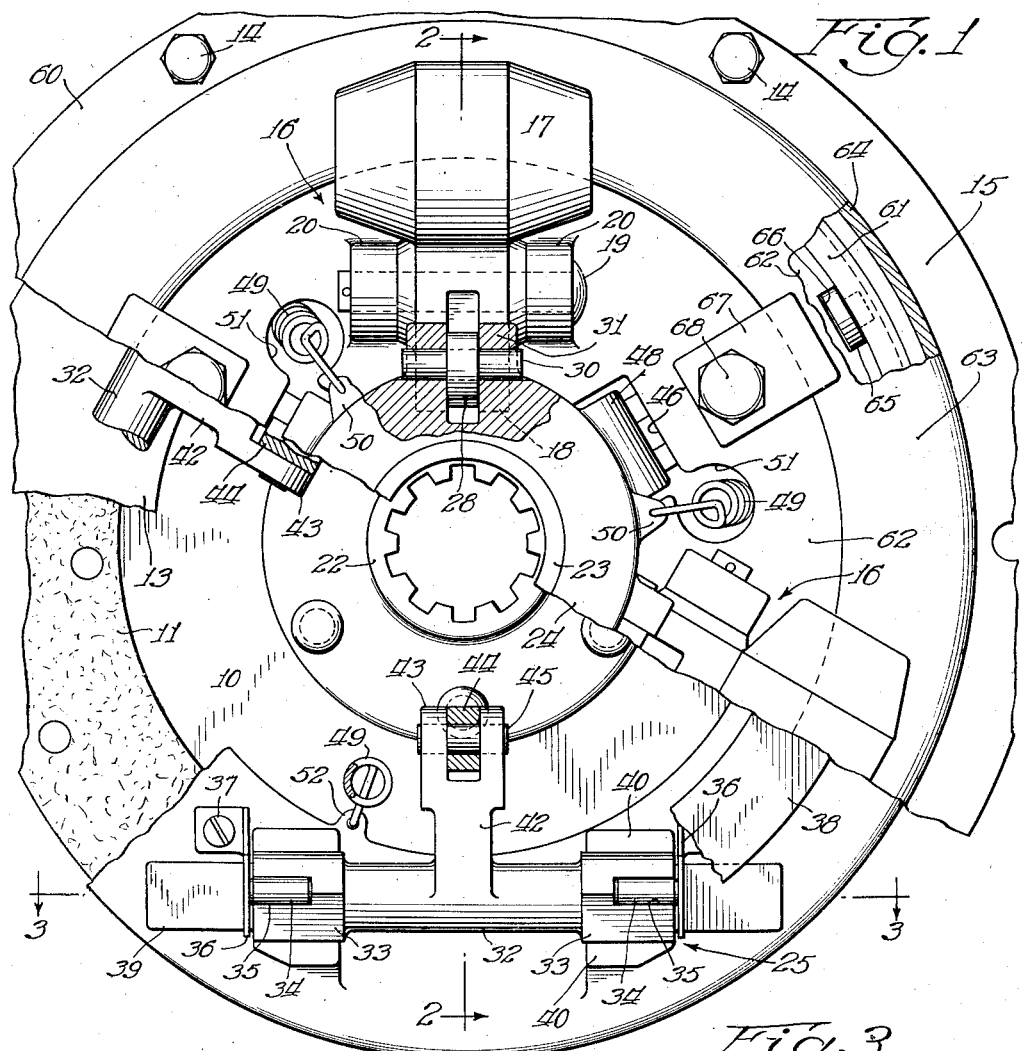
Fig. 1 is a rear elevation of a clutch embodying the invention, parts being broken away to better illustrate the construction.
Figure 3:
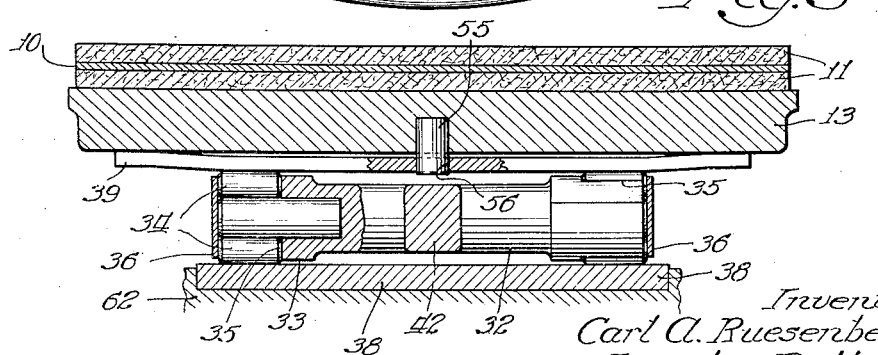
Fig. 3 is a detailed tangential sectional view, taken as indicated by the line 3—3 of Fig. 1; illustrating the force multiplying mechanism.

As an illustration of one form in which the invention may be embodied, we have shown in Figs. 1 and 2 an automatic clutch wherein a conventional drive plate 10, including friction facings 11, is adapted to be packed between a pair of clutch members, one of which comprises the flywheel 12 of the engine to which the clutch is applied, and the other of which comprises the conventional pressure plate 13. To the flywheel 12 may be secured, as by cap screws 14, the cover plate 15 which serves as a reaction member upon which may be fulcrumed the centrifugal elements 16.

The centrifugal elements 16 are preferably in the form of levers disposed roughly in radial positions with their outer arms provided with weights 17 and their inner arms 18 projecting radially inwardly from a fulcrum pin 19 upon which they are mounted. The pins 19 may be mounted in spaced ears 20, and each lever may be received between a pair of the ears 20.

The driven shaft 21, which may be splined in a conventional manner in the hub 22 of the driven plate 10, extends through a bushing 23 which is mounted in the cover plate 15 and projects rearwardly therefrom. Axially slidable on the bushing 23 is an intermediate member in the form of a sleeve 24 encircling the bushing 23, and serving the double purpose, first of transmitting from the centrifugal elements 16 to the force multiplying mechanism (designated generally at 25) the centrifugal forces developed in the elements 16, and, second, of transmitting directly to the centrifugal elements 16 pressure from the manual release means which may include a conventional release fork 26 and release collar 27.

The sleeve 24 is connected to the inner arms 18 of the levers 16, by means of links 28, each pivoted at one end on a pin 29 between the bifurcations of a respective lever arm 18 and at its other end on a pin 30 between a pair of ears 31 formed on the sleeve 24.

Each of the force multiplying devices 25 comprises an elongated cylindrical cam member 32 having integral enlarged cam heads 33 at its respective ends, and is disposed between the pressure plate 13 and the cover plate 15 in a position extending tangentially of a circumference of the major axis of the clutch. The high regions of the cam heads 33 are defined by anti-friction rollers 34 loosely socketed in recesses 35 in the heads 33. The rollers 34 are retained in the recesses 35 by end plates 36 secured at 37 to the pressure plate 13 and disposed in embracing, confining relationship to the respective ends of the cam member 32.

One of the rollers 34 of each cam head is arranged to engage against a hardened ring 38 inset into the cover 15, and the opposite roller 34 is adapted to engage against a bowed leaf spring 39 which is interposed between the cam element 32 and the pressure plate 13, with its end regions engaging the pressure plate 13 and its intermediate portion, including the region engaged by the rollers 34, spaced away from the plate 13.

The springs 39 are piloted on studs 55 mounted in the pressure plate 13. The studs 55 extend through openings 56 in the respective springs. Thus the springs 39 are located against tangential displacement.

The cam element 32 and the spring 39 are retained against radial displacement by pairs of lugs 40 which are shaped so as to snugly receive the spring 39 between their base portions and flared outwardly so as to form bearing surfaces for coaction with the cylindrical bearing surfaces 41 of the cam heads 33.

Each cam element 32 is formed, intermediate its ends, with a radially projecting integral lever 42 projecting toward the major axis of the clutch and formed at its inner end with a fork 43. A pull link 44 is pivoted on a pin 45 in a respective fork 43, and extends axially through an opening 46 in the cover plate 62, its other end being pivoted on a pin 47 between a pair of ears 48 formed on the forward end of the sleeve 24.

The pressure plate 13 is urged away from the driven plate 10 by means of retractor springs 49 each attached at one end to an ear 50 formed on the sleeve 24, extending through an opening 51 in the cover plate 15, and attached at its other end to an ear 52 on the pressure plate 13.

The cover plate 15 is made in several parts which are adjustable relative to each other in order to provide for adjustment between the cover plate, the pressure plate 13, and the force multiplying mechanism 25. These parts include a rim portion 60, which is attached directly to the flywheel 12, and which has an axially extending flange 61, a reaction plate 62 in which the hardened bearing link 38 is mounted, and which is axially slidable within the flange 61, and an adjusting collar 63 engaging against the reaction plate 62 and having a rim flange 64 which is threaded upon the flange 61. Rotation of the collar 63 on its threaded connection with the flange 61 will cause it to move axially, thereby varying the axial position at which it supports the central disc portion 62 against pressure of the cam heads 33.

The disc portion 62 is located against rotation relative to the rim portion 60, by means of studs 65 mounted in the flange 61 and engaged in notches 66 (Fig. 1) in the disc portion 62. The collar 63 is locked against unscrewing by clamping lugs 67 and clamping screws 68 threaded into the disc portion 62.

In the operation of the clutch, the retractor springs 49 will hold the clutch disengaged when the engine is not operating. When the engine is running, the cover plate 15, which is rigidly associated with the flywheel 12 of the engine, will carry the centrifugal elements 16 in a circular orbit, thus causing centrifugal force to be developed in the weighted outer portions 17 thereof, which project at an angle between an axial and a radial direction.

The centrifugal force thus developed in the centrifugal elements 16 will be transmitting through the thrust links 28 to the sleeve 24 and from the sleeve 24 through the pull links 44 to the levers 42 of the cam elements 32, tending to rotate the cam heads 33 in a direction (clockwise as viewed in Fig. 2) to exert expanding pressure between the cover plate 15 and the pressure plate 13. The rollers 34 provide the contact with the springs 39 and the hardened ring 38 respectively, thus largely eliminating friction as a factor in the automatic operation of the device.

The maximum pressure which can be transmitted to the pressure plate 13 is determined by the resistance of the leaf springs 39. When such maximum pressure has been attained, any further increase in centrifugal force developed in the centrifugal elements 16 will result in compression of the springs 39, allowing the weights 17 to move further outwardly toward more truly radial positions, and thereby tending to maintain the centrifugal force at an even level.

When it is desired to release the clutch manually, the manual control element, which may or may not be a conventional clutch pedal, is depressed, causing the fork 26 to move forwardly and transmit pressure to the sleeve 24 through the medium of the collar 27, in opposition to the pressure transmitted to the sleeve 24 by the centrifugal elements 16. Thus it is necessary to overcome only the pressure developed in the centrifugal elements 16, the total of which is only a fractional portion of the amount of pressure developed between the pressure plate 13 and cover plate 15 by the force multiplying devices 25.

In Fig. 4 is shown an automatic clutch without a manual overcontrol, embodying the principles of construction and arrangement of the invention with respect to the centrifugal elements, the force multiplying means, and the connecting linkage. These parts are all the same as in the preferred form of the invention, and are referred to by the same reference characters, with the exception of the pull links 44a, which are pivoted directly to the inner ends of the arms 18 of the centrifugal elements, as at 29a, the sleeve 24 and manual release mechanism being eliminated. The operation of this clutch is the same as the preferred form of the clutch, with the exception that it does not embody the manual release.

We claim:

1. In a centrifugal clutch, a pair of clutch members between which a clutch part is adapted to be packed, a plurality of centrifugal force responsive weighted levers fulcrumed on one of said members, an axially movable sleeve, coaxial with the major axis of the clutch, links connecting said sleeve to each of said levers so as to transmit to said sleeve the centrifugal forces developed in said levers, force multiplying mechanism interposed between said sleeve and the other clutch member, adapted to transmit to the latter, in multiplied amount, the pressure received from said sleeve, comprising an axially extending link pivoted at one end to said force-multiplying mechanism, extending through said cover plate, and pivoted at its other end to said sleeve, and manual release means for applying manual pressure directly to said sleeve in opposition to said centrifugal forces.

2. In a centrifugal clutch, a pressure plate, a cover plate, a plurality of levers, weighted at their outer ends and fulcrumed on said cover plate for swinging movement in radial planes, a driven shaft, an axially movable sleeve through which said shaft extends, axially extending links pivoted to the inner ends of said levers and to said sleeve, for transmitting to the latter the centrifugal forces developed in said levers, force multiplying cam devices operatively interposed between said sleeve and said pressure plate, adapted to transmit to said pressure plate, in multiplied amount, the pressure received from said sleeve, comprising a plurality of symmetrically spaced axially extending links each pivoted at one end to a corresponding cam lever, extending through the cover plate, and pivoted at its other end to said sleeve, and manual release means for applying manual pressure directly to said sleeve in opposition to said centrifugal forces.

3. In a centrifugal clutch, a pressure plate, a cover plate, a plurality of centrifugal force responsive elements movably mounted on said cover plate, a driven shaft, a sleeve through which said shaft extends, said sleeve being axially slidable and adapted to receive from said elements the centrifugal forces developed therein, force multiplying cam devices interposed between said pressure plate and said cover plate, each of said cam devices being provided with a radially extending operating lever, axially extending links each pivoted at one end to a corresponding cam lever, extending through said cover plate, and pivoted at its other end to said sleeve, and means for applying manual pressure directly to said sleeve in opposition to said centrifugal forces.

4. In a centrifugal clutch, a pressure plate, a cover plate, a plurality of levers, weighted at their outer ends and fulcrumed on said cover plate for swinging movement in radial planes, force multiplying cam devices interposed between said pressure plate and said cover plate, each of said devices being provided with a radially inwardly extending lever, and means for transmitting from the inner ends of said weighted levers to the inner ends of said cam levers, the centrifugal forces developed in said weighted levers, said means including axially extending links extending through said cover plate and pivoted to said cam levers.

5. In a friction clutch, a pressure plate, a cover plate and means for spreading said plates, said means including a plurality of circumferentially spaced, tangentially disposed, bowed leaf spring elements, the ends of which are in engagement with the pressure plate, elongated cam devices interposed between said cover plate and said spring elements, parallel to the latter, and means for rotating said cam elements to effect the spreading movement.

6. In a friction clutch, a pressure plate, a cover plate and means for spreading said plates, said means including a plurality of circumferentially spaced, tangentially bowed leaf spring elements, the ends of which are in engagement with the pressure plate, elongated cam devices interposed between said cover plate and said spring elements, parallel to the latter, and centrifugal force responsive means for rotating said cam elements to effect the spreading movement.

7. In a centrifugal clutch, a pressure plate, a cover plate, a plurality of centrifugal force responsive elements movably mounted on said cover plate, a driven shaft, a sleeve through which said shaft extends, said sleeve being axially slidable and adapted to receive from said elements the centrifugal forces developed therein, a plurality of circumferentially spaced, tangentially disposed, bowed leaf springs, the ends of which are in engagement with the pressure plate, elongated cam devices interposed between the cover plate and said spring elements, and means actuated by said sleeve under the effect of said centrifugal forces for rotating said cam devices so as to spread said plates.

8. In a friction clutch, a pressure plate, a cover plate, and means for spreading said plates, said means including a plurality of circumferentially spaced cushioning elements carried by the pressure plate, cam devices interposed between the cover plate and the pressure plate, in engagement with the cover plate and said cushioning elements, and means for rotating said cam devices to effect spreading movement between said cover plate and said pressure plate.

9. In a friction clutch, a flywheel provided with an axially projecting externally threaded annular flange, a pressure plate, a reaction plate piloted within said flange and having an axially slidable and non-rotatable connection therewith, centrifugal clutch packing mechanism carried by said reaction plate, means for transferring the centrifugal pressure to the pressure plate, and means for adjusting said reaction plate relative to said pressure plate, comprising a collar threadably embracing said flange, said collar having a radially inwardly disposed flange portion engaging said reaction plate.

10. A friction clutch as defined in claim 8, wherein said cushion elements comprise bowed leaf spring elements the ends of which are in engagement with the pressure plate and the intermediate regions of which are engaged by said cam devices.

11. A friction clutch as defined in claim 8, wherein said cushioning elements comprise tangentially bowed leaf spring elements, the ends of which are in engagement with the pressure plate and the intermediate regions of which are engaged by the respective cam devices, the axes of rotation of said cam devices being parallel to the respective leaf spring elements.

CARL A. RUESENBERG.
JOSEPH PATKUS.